(12) United States Patent
Yoo et al.

(10) Patent No.: US 9,344,627 B2
(45) Date of Patent: May 17, 2016

(54) IMAGE SENSOR AND COMPUTING SYSTEM HAVING THE SAME

(71) Applicant: Samsung Electronics Co., Ltd., Suwon-si (KR)

(72) Inventors: Kwi-Sung Yoo, Seoul (KR); Yu-Jin Park, Seoul (KR); Jae-Hong Kim, Suwon-si (KR); Jin-Ho Seo, Seoul (KR); Wun-Ki Jung, Suwon-si (KR); Han-Kook Cho, Suwon-si (KR); Seog-Heon Ham, Suwon-si (KR); Min-Ji Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 104 days.

(21) Appl. No.: 14/105,594

(22) Filed: Dec. 13, 2013

(65) Prior Publication Data
US 2014/0232890 A1    Aug. 21, 2014

(30) Foreign Application Priority Data
Feb. 20, 2013 (KR) .................. 10-2013-0018004

(51) Int. Cl.
*H04N 5/225* (2006.01)
*H04N 5/228* (2006.01)
*H03M 1/12* (2006.01)
*H04N 5/232* (2006.01)
*H04N 5/378* (2011.01)

(52) U.S. Cl.
CPC ........... *H04N 5/23245* (2013.01); *H04N 5/378* (2013.01)

(58) Field of Classification Search
CPC ..... H04N 5/378; H04N 5/3575; H04N 5/363; H04N 5/374; H04N 9/045; G11C 19/282; H01L 27/14645; H01L 27/14843; H01L 31/02162; H01L 31/0232; H03F 3/45475; H03G 3/002; H03M 3/476; H04B 10/541
USPC ............ 348/220.1, 222.1, 241, 362; 341/155
See application file for complete search history.

(56) References Cited

U.S. PATENT DOCUMENTS

| | | | |
|---|---|---|---|
| 6,900,832 B1 | 5/2005 | Yano | |
| 7,518,540 B2 | 4/2009 | Augusto et al. | |
| 2008/0170137 A1* | 7/2008 | Matsumoto | H04N 5/347 348/241 |
| 2008/0240301 A1* | 10/2008 | Mandal | G01R 23/163 375/340 |
| 2009/0261998 A1* | 10/2009 | Chae | H03M 3/46 341/118 |
| 2009/0295959 A1 | 12/2009 | Shoho et al. | |
| 2009/0303361 A1 | 12/2009 | Saito et al. | |
| 2010/0277622 A1* | 11/2010 | Fossum | H04N 5/378 348/241 |
| 2011/0317039 A1 | 12/2011 | Ise | |

(Continued)

FOREIGN PATENT DOCUMENTS

| | | |
|---|---|---|
| JP | 5-276452 | 10/1993 |
| JP | 2008-236462 | 10/2008 |
| JP | 2010-109893 | 5/2010 |

*Primary Examiner* — Trung Diep
(74) *Attorney, Agent, or Firm* — Onello & Mello LLP

(57) ABSTRACT

An image sensor includes a pixel array and an analog-to-digital (A/D) conversion unit. The pixel array generates an analog signal by sensing an incident light. The A/D conversion unit generates a digital signal in a first operation mode by performing a sigma-delta A/D conversion and a cyclic A/D conversion with respect to the analog signal and generates the digital signal in a second operation mode by performing a single-slope A/D conversion with respect to the analog signal. The image sensor provides a high-quality image in a still image photography mode and a dynamic image video mode.

20 Claims, 12 Drawing Sheets

(56) References Cited

U.S. PATENT DOCUMENTS

| | | |
|---|---|---|
| 2012/0038809 A1 | 2/2012 | Lee et al. |
| 2013/0182164 A1* | 7/2013 | Duggal .................. G05F 1/10 348/302 |
| 2013/0271307 A1* | 10/2013 | Kropfitsch ............ H03G 3/002 341/158 |

* cited by examiner

311a

IMAGE SENSOR AND COMPUTING SYSTEM HAVING THE SAME

CROSS-REFERENCE TO RELATED APPLICATION

This application claims priority under 35 USC §119 to Korean Patent Application No. 10-2013-0018004, filed on Feb. 20, 2013, in the Korean Intellectual Property Office (KIPO), the contents of which are herein incorporated by reference in their entirety.

FIELD

The inventive concept relates generally to an image sensor, and more particularly to an image sensor capable of photographing a still image and a dynamic video images, also referred to as video or dynamic video, and a computing system having the same.

BACKGROUND

An image sensor used in a general digital camera can photograph both a still image and dynamic video. In the case of the still image, it is important to provide an image having a high resolution. In contrast, in the case of the dynamic video, it is important to provide a video having a high frame rate at a high speed. In addition, it is necessary to provide an image having as little noise as possible when photographing the still image and the dynamic video.

Therefore, an image sensor having a performance suitable to photograph the still image and to capture the dynamic video would be useful.

SUMMARY

In accordance with some aspects of the inventive concept, there is provided an image sensor capable of providing a high-quality still image in a photography mode and a high quality dynamic video imaging in a video mode.

In accordance with some aspects of the inventive concepts, there may be provided a computing system having such an image sensor.

According to one aspect of the inventive concept, provided is an image sensor that includes a pixel array and an analog-to-digital (A/D) conversion unit. The pixel array generates an analog signal by sensing an incident light. The analog-digital conversion unit generates a digital signal in a first operation mode by performing a sigma-delta analog-digital conversion and a cyclic analog-digital conversion with respect to the analog signal and generates the digital signal in a second operation mode by performing a single-slope analog-digital conversion with respect to the analog signal.

In various embodiments, the first operation mode may be a still image photography mode and the second operation mode may be a dynamic image video mode.

In various embodiments, in the first operation mode, the analog-digital conversion unit may generate most significant bits of the digital signal and residues by performing the sigma-delta analog-digital conversion with respect to the analog signal and generate least significant bits of the digital signal by performing the cyclic analog-digital conversion with respect to the residues.

In various embodiments, the image sensor may further include a reference signal generating unit that generates a reference signal having a voltage of a constant amplitude and a ramp signal varying at a constant slope.

In various embodiments, the pixel array may generate a first analog signal representing a reset component and a second analog signal representing an image component, and the analog-digital conversion unit may generate a first digital signal corresponding to the first analog signal and a second digital signal corresponding to the second analog signal and output the digital signal based on a difference between the first and second digital signals.

In various embodiments, the analog-digital conversion unit may include a first conversion unit configured to generate the digital signal in the first operation mode by sequentially performing the sigma-delta analog-digital conversion and the cyclic analog-digital conversion with respect to the first and second analog signals, respectively, by using the reference signal, and a second conversion unit configured to generate the digital signal in the second operation mode by performing the single-slope analog-digital conversion with respect to the first and second analog signals, respectively, by using a count clock signal and the ramp signal.

In various embodiments, the first conversion unit may include a correlated double sampling unit configured to generate a reset signal and an image signal by performing a correlated double sampling with respect to the first and second analog signals, a switch connected to an output terminal of the correlated double sampling unit for a first time period and connected to a first node for a second time period, a subtractor configured to generate a differential signal by subtracting a feedback signal from a signal supplied through the switch, an integrator configured to output an integrate signal to the first node by integrating the differential signal, a comparator configured to output a compare signal by comparing an amplitude of the integrate signal with an amplitude of the reference signal, a digital-analog converter configured to generate the feedback signal by converting the compare signal into an analog signal, and a counter configured to generate the digital signal based on the compare signal.

In various embodiments, the counter may generate most significant bits of the first digital signal by summing up the compare signals generated during the first time period when the correlated double sampling unit outputs the reset signal, generate least significant bits of the first digital signal by using the compare signals generated during the second time period, generate most significant bits of the second digital signal by summing up the compare signals generated during the first time period when the correlated double sampling unit outputs the image signal, generate least significant bits of the second digital signal by using the compare signals generated during the second time period, and generate the digital signal by subtracting the first digital signal from the second digital signal.

In various embodiments, the second conversion unit may include a correlated double sampling unit configured to generate a reset signal and an image signal by performing a correlated double sampling with respect to the first and second analog signals, a comparator configured to output a compare signal by comparing an amplitude of the reset signal and the image signal with the ramp signal, and a counter configured to generate a first count value by performing a counting operation in synchronization with the count clock signal until the compare signal is transited when the correlated double sampling unit outputs the reset signal, to generate a second count value by performing the counting operation in synchronization with the count clock signal until the compare signal is transited when the correlated double sampling unit outputs the image signal, and to generate the digital signal by subtracting the first count value from the second count value.

In various embodiments, the analog-digital conversion unit may include a correlated double sampling unit configured to generate a reset signal and an image signal by performing a correlated double sampling with respect to the first and second analog signals, a demultiplexer configured to output the reset signal and the image signal through a first output terminal thereof in the first operation mode and to output the reset signal and the image signal through a second output terminal thereof in the second operation mode, a first conversion circuit configured to generate a first compare signal based on a value, which is obtained by integrating a signal received through the first output terminal of the demultiplexer, and the reference signal, a second conversion circuit configured to generate a second compare signal based on a signal received through the second output terminal of the demultiplexer and the ramp signal, and a counter configured to generate the digital signal in the first operation mode by summing up the first compare signals and to generate the digital signal in the second operation mode by performing a counting operation in synchronization with a count clock signal until the second compare signal is transited.

In various embodiments, the first conversion circuit may include a switch connected to the first output terminal of the demultiplexer for a first time period and connected to a first node for a second time period, a subtractor configured to generate a differential signal by subtracting a feedback signal from a signal supplied through the switch, an integrator configured to output an integrate signal to the first node by integrating the differential signal, a first comparator configured to output a first compare signal by comparing an amplitude of the integrate signal with an amplitude of the reference signal, and a digital-analog converter configured to generate the feedback signal by converting the first compare signal into the analog signal.

In various embodiments, the second conversion circuit may include a second comparator to generate the second compare signal by comparing an amplitude of a signal output through the second output terminal of the demultiplexer with an amplitude of the ramp signal.

In various embodiments, the analog-digital conversion unit may include a correlated double sampling unit configured to generate a reset signal and an image signal by performing a correlated double sampling with respect to the first and second analog signals, a conversion circuit configured to generate a compare signal in the first operation mode based on a value, which is obtained by integrating the reset signal and the image signal, and the reference signal and to generate the compare signal in the second operation mode based on the reset signal or the image signal and the ramp signal, and a counter configured to generate the digital signal in the first operation mode by summing up the compare signals and to generate the digital signal in the second operation mode by performing a counting operation in synchronization with a count clock signal until the compare signal is transited.

In various embodiments, the conversion circuit may include a switch connected to an output terminal of the correlated double sampling unit for a first time period and connected to a first node for a second time period in the first operation mode, a subtractor configured to generate a differential signal by subtracting a feedback signal from a signal supplied through the switch, an integrator configured to output an integrate signal to the first node by integrating the differential signal, a first multiplexer configured to output the integrate signal in the first operation mode and to output the reset signal and the image signal in the second operation mode, a second multiplexer configured to output the reference signal in the first operation mode and to output the ramp signal in the second operation mode, a comparator configured to generate the compare signal by comparing an amplitude of an output signal of the first multiplexer with an amplitude of an output signal of the second multiplexer, and a digital-analog converter configured to generate the feedback signal by converting the compare signal into the analog signal.

According to another aspect of the inventive concept, provided is a computing system includes an image sensor, a storage device, and a processor. The image sensor generates a digital signal corresponding to an incident light. The storage device stores the digital signal. The processor controls operations of the image sensor and the storage device. The image sensor includes a pixel array and an analog-digital conversion unit. The pixel array generates an analog signal by sensing the incident light. The analog-digital conversion unit generates the digital signal in a first operation mode by performing a sigma-delta analog-digital conversion and a cyclic analog-digital conversion with respect to the analog signal and generates the digital signal in a second operation mode by performing a single-slope analog-digital conversion with respect to the analog signal.

In various embodiments, the first operation mode may be a still image photography mode and the second operation mode may be a dynamic image video mode.

In accordance with another aspect of the inventive concept, provided is a method of sensing an image. The method comprises generating an analog signal by a pixel array in response to sensing an incident light; generating a digital signal in a first operation mode by performing a sigma-delta A/D conversion and a cyclic A/D conversion with respect to the analog signal by an analog-digital (A/D) conversion unit; and generating the digital signal in a second operation mode by performing a single-slope A/D conversion with respect to the analog signal by the analog-digital (A/D) conversion unit.

In various embodiments, the first operation mode may be a still image photography mode and the second operation mode may be a dynamic image video mode.

In various embodiments, the method may further comprise generating most significant bits of the digital signal and residues by performing the sigma-delta A/D conversion with respect to the analog signal and to generate least significant bits of the digital signal by performing the cyclic A/D conversion with respect to the residues, in the first operation mode, by the A/D conversion unit.

In various embodiments, the method may further comprise generating a reference signal having a voltage of a substantially constant amplitude and a ramp signal varying at a substantially constant slope by a reference signal generating unit.

BRIEF DESCRIPTION OF THE DRAWINGS

The inventive concept will be more clearly understood from the following detailed description taken in conjunction with the accompanying drawings depicting illustrative embodiments in accordance therewith.

DETAILED DESCRIPTION OF THE EMBODIMENTS

Figure 1:
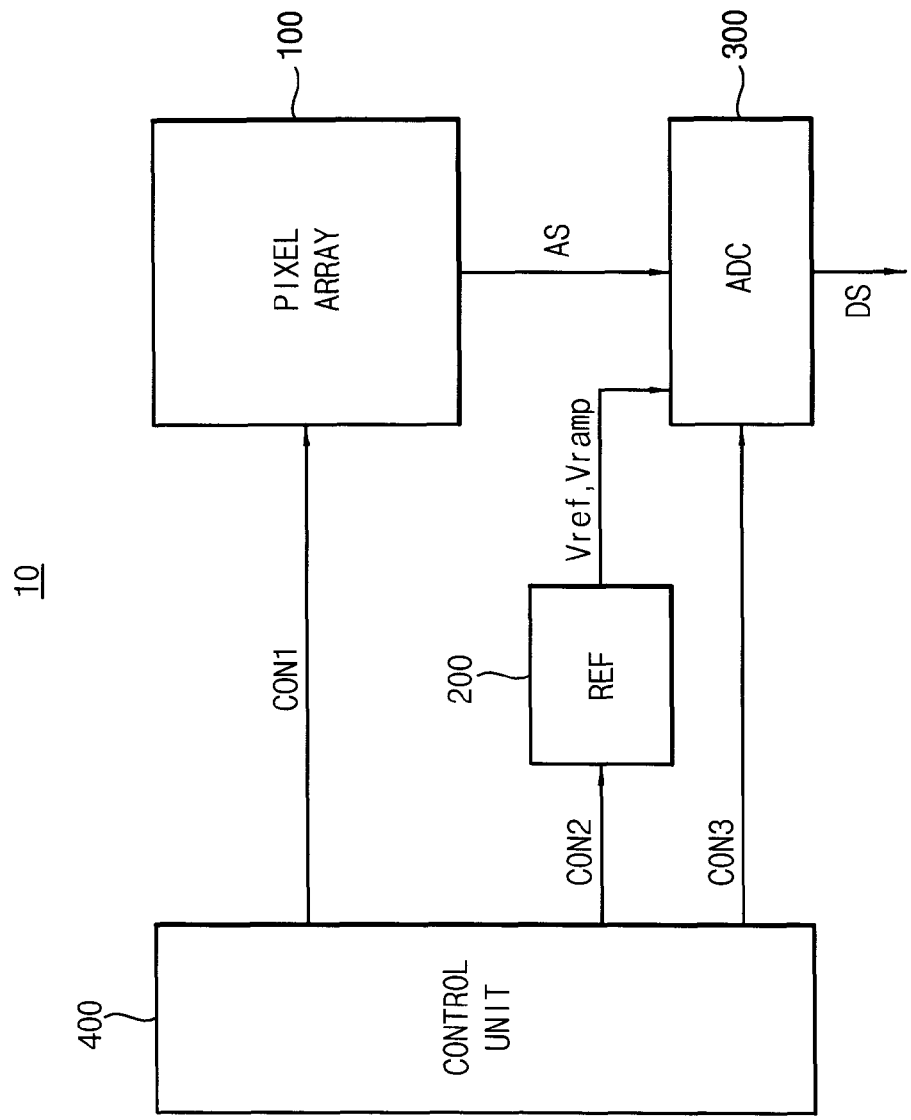
FIG. 1 is a block diagram illustrating an embodiment of an image sensor according to aspects of the inventive concept.

Various aspects of the inventive concept will be described with reference to the accompanying drawings, in which some example embodiments are shown. The present inventive concept may, however, be embodied in many different forms and should not be construed as limited to the embodiments set forth herein. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an embodiment of an image sensor according to an aspect of the inventive concept.

Referring to the embodiment of FIG. 1, an image sensor 10 includes a pixel array 100, a reference signal generating unit (REF) 200, an analog-to-digital (A/D) conversion unit (ADC) 300, and a control unit 400.

The pixel array 100 detects incident light to generate an analog signal AS. The pixel array 100 may include a plurality of unit pixels arranged in the form of a matrix and each unit pixel may detect the incident light to collectively generate the analog signal AS.

The reference signal generating unit 200 generates a reference signal Vref having a voltage of a constant amplitude in a first operation mode and generates a ramp signal Vramp, which linearly varies at a constant slope, in a second operation mode.

The A/D conversion unit 300 performs a sigma-delta A/D conversion and a cyclic A/D conversion with respect to the analog signal AS by using the reference signal Vref to generate a digital signal DS in the first operation mode. In one example embodiment, the A/D conversion unit 300 may perform the sigma-delta A/D conversion with respect to the analog signal AS to generate most significant bits and residues of the digital signal DS and may perform the cyclic A/D conversion with respect to the residues to generate least significant bits of the digital signal DS in the first operation mode.

The A/D conversion unit 300 performs a single-slope A/D conversion with respect to the analog signal AS by using the ramp signal Vramp to generate the digital signal DS in the second operation mode.

The control unit 400 controls the operation of the pixel array 100 through a first control signal CON1, controls the operation of the reference signal generating unit 200 through a second control signal CON2 and controls the operation of the A/D conversion unit 300 through a third control signal CON3.

The first operation mode may be a still image photography mode and the second operation mode may be a dynamic image video mode.

Figure 2:
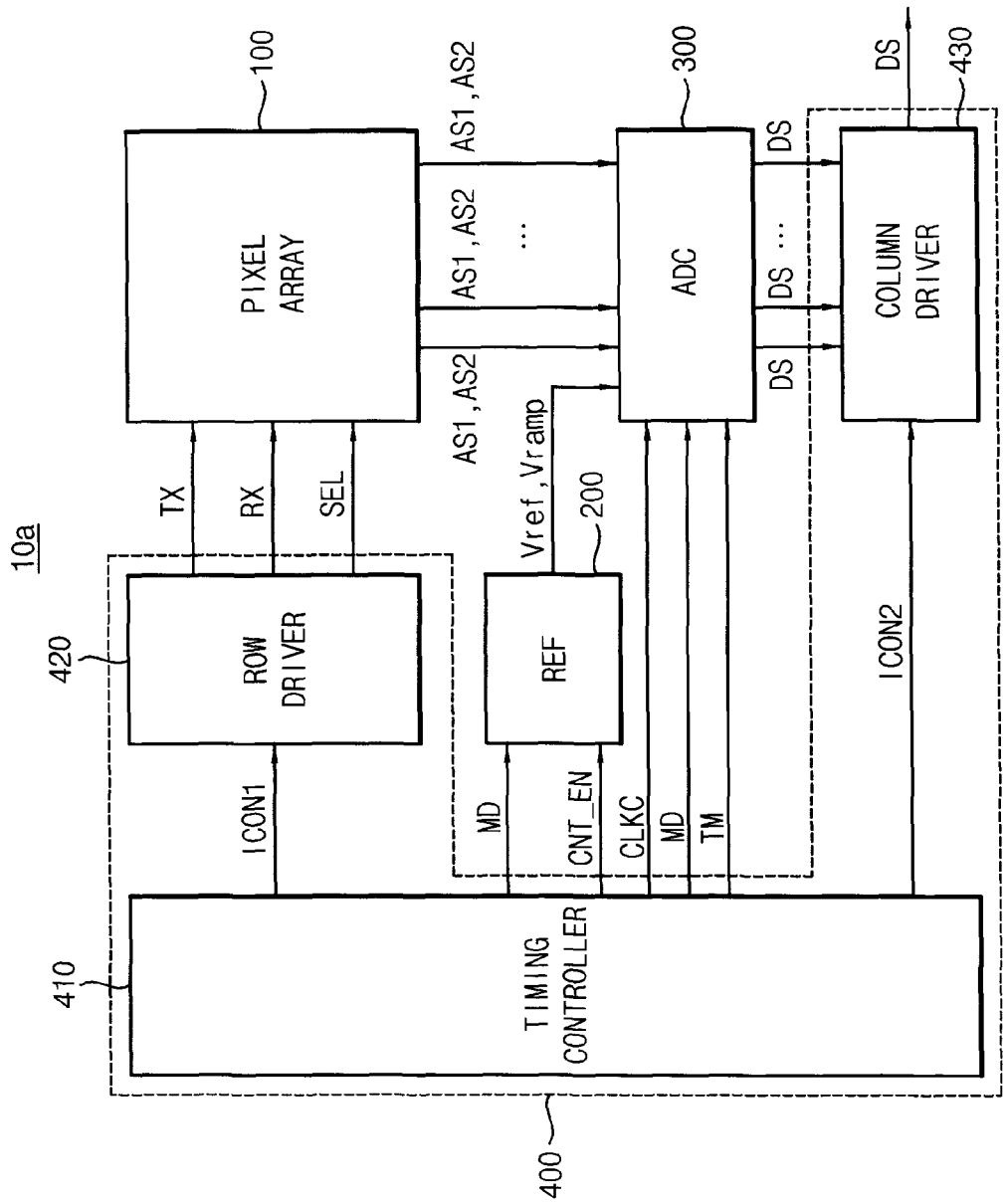
FIG. 2 is a block diagram illustrating an embodiment of the image sensor shown in FIG. 1.

FIG. 2 is a block diagram illustrating an example embodiment of the image sensor shown in FIG. 1.

Referring to the embodiment of FIG. 2, the image sensor 10a includes a pixel array 100, a reference signal generating unit (REF) 200, an A/D conversion unit (ADC) 300 and a control unit 400. The control unit 400 may include a timing controller 410, a row driver 420 and a column driver 430.

The timing controller 410 provides a first internal control signal ICON1 to the row driver 420 and the row driver 420 may control the operation of the pixel array 100 in a unit of row based on the first internal control signal ICON1. For instance, the row driver 420 provides a row select signal SEL, a reset control signal RX and a transfer control signal TX to the pixel array 100 to control the operation of the pixel array 100 in a unit of row.

The pixel array 100 may generate a first analog signal AS1 representing a reset component and a second analog signal AS2 representing an image component based on the row select signal SEL, the reset control signal RX, and the transfer control signal TX provided from the row driver 420. Since each of the unit pixels included in the pixel array 100 has its own pixel property or logic property to output the analog signal AS, variation may occur in amplitude of the analog signal AS generated from the unit pixels based on the same incident light. Thus, it is necessary to extract the effective component of the incident light based on the difference between the reset component generated from each unit pixel and the image component according to the incident light.

To this end, each of the unit pixels included in the pixel array 100 sequentially generates the first analog signal AS1 representing the reset component and the second analog signal AS2 representing the image component according to the incident light based on the row select signal SEL, the reset control signal RX and the transfer control signal TX provided from the row driver 420, and the A/D conversion unit 300 generates a first digital signal corresponding to the first analog signal AS1 and a second digital signal corresponding to the second analog signal AS2 to output the digital signal DS based on the difference between the first and second digital signals. Therefore, the digital signal DS may represent the effective component of the incident light.

Figure 3:
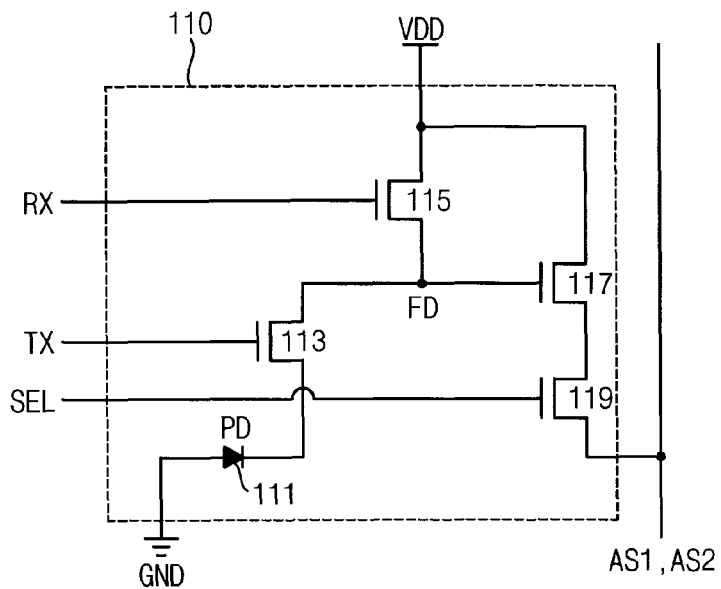
FIG. 3 is a circuit diagram illustrating an embodiment of a unit pixel included in a pixel array shown in FIG. 2.

FIG. 3 is a circuit diagram illustrating an example embodiment of the unit pixel included in the pixel array shown in FIG. 2.

Referring to the embodiment of FIG. 3, the unit pixel 110 may include a photo detector (PD) 111, a transfer transistor 113, a reset transistor 1'15, a sensing transistor 117 and a row select transistor 119.

Hereinafter, the operation of the unit pixel 110 will be described with reference to FIGS. 2 and 3.

The photo detector 111 detects the incident light to generate EHP (electron-hole pair) and the EHP is accumulated in a source node of the transfer transistor 113.

The row driver 420 provides an activated row select signal SEL to the pixel array 100 to turn on the row select transistor 119 to select one of the rows included in the pixel array 100 and provides an activated reset control signal RX to the selected row to turn on the reset transistor 115. Therefore, an electric potential of a first node FD may have a level of a supply voltage VDD and the sensing transistor 117 is turned on so that the first analog signal AS1 representing the reset component is output from the unit pixel 110. Then, the row driver 420 deactivates the reset control signal RX.

Meanwhile, the row driver 420 provides an activated transfer control signal TX to the pixel array 100 to turn on the transfer transistor 113 so that the electrons of the EHP accumulated in the source node of the transfer transistor 113 are transferred to the first node FD. The electric potential of the first node FD may vary depending on the quantity of the electrons of the EHP and the electric potential of a gate of the sensing transistor 117 may also vary. If the row select transistor 119 is in a turn-on state, the second analog signal AS2 corresponding to the electric potential of the first node FD is output from the unit pixel 110.

Then, the row driver 420 sequentially outputs the first and second analog signals AS1 and AS2 in a unit of row by repeating the above operation with respect to subsequent rows.

Referring again to the embodiment of FIG. 2, the timing controller 410 provides a mode signal MD and a count enable signal CNT_EN to the reference signal generating unit 200 to control the operation of the reference signal generating unit 200.

The reference signal generating unit 200 may determine the operation mode based on a logic level of the mode signal MD. For instance, if the mode signal MD has a first logic level, the reference signal generating unit 200 may operate in the first operation mode. In addition, if the mode signal MD has a second logic level, the reference signal generating unit 200 may operate in the second operation mode. The reference signal generating unit 200 may generate the reference signal Vref having a voltage of a constant amplitude in the first operation mode and may generate the ramp signal Vramp, which descends with a constant slope during an active period where the count enable signal CNT_EN is enabled, in the second operation mode.

Figure 4:
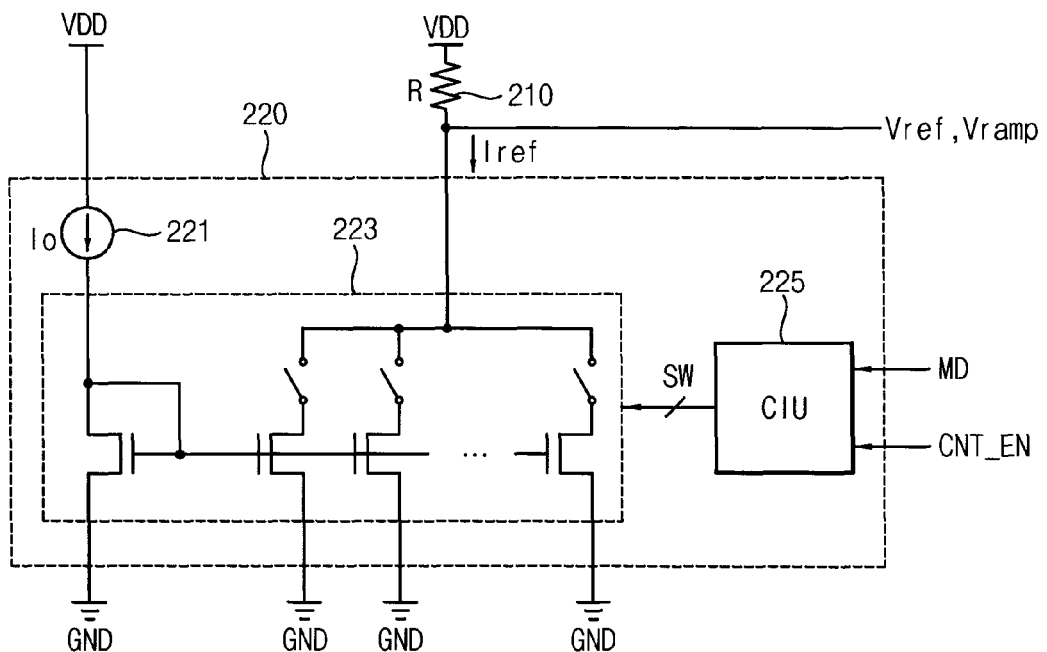
FIG. 4 is a block diagram illustrating an embodiment of a reference signal generating unit shown in FIG. 2.

FIG. 4 is a block diagram illustrating an embodiment example of the reference signal generating unit 200 shown in FIG. 2, referred to as reference signal generating unit 200a. The reference signal generating unit 200a may include a resistor 210 and a current generating unit 220.

The resistor 210 may be connected between the supply voltage VDD and the current generating unit 220 and may have a resistance value R, having a constant amplitude.

The current generating unit 220 may be connected between the resistor 210 and a ground voltage GND. The current generating unit 220 can receive the mode signal MD and the count enable signal CNT_EN from the control unit 400. When the mode signal MD has the first logic level, the current generating unit 220 operates in the first operation mode to generate a reference current Iref having a constant amplitude. In addition, when the mode signal MD has the second logic level, the current generating unit 220 operates in the second operation mode to generate the reference current Iref, which increases at a constant rate during the active period where the count enable signal CNT_EN is enabled.

The current generating unit 220 may include a constant current source 221, a current amplifying unit 223, and a current control unit (CIU) 225.

The constant current source 221 may generate a constant current Io having a constant, or substantially constant, amplitude.

The current amplifying unit 223 may amplify the constant current Io based on an amplifying control signal SW supplied from the current control unit 225. As illustrated in FIG. 4, the current amplifying unit 223 may include a plurality of current mirrors having an NMOS (N-type Metal Oxide Semiconductor) transistor and a switch, respectively.

The current amplifying unit 223 generates the amplifying control signal SW based on the mode signal MD and the count enable signal CNT_EN and supplies the amplifying control signal SW to the switches of the current mirrors to adjust the amplitude of the reference current Iref flowing through the resistor 210 by selectively turning on/off the switches.

The reference signal generating unit 200a may output the reference signal Vref and the ramp signal Vramp from the node where the resistor 210 is connected to the current amplifying unit 230.

In the first operation mode, the current control unit 225 short-circuits some of switches to output the reference signal Vref having a voltage of a constant amplitude. The voltage of the reference signal Vref may be changed by adjusting the number of switches short-circuited in the first operation mode. In the second operation mode, the current control unit 225 opens all of the switches to output the ramp signal Vramp having the maximum value and reduces the amplitude of the ramp signal Vramp by sequentially short-circuiting the switches during the active period where the count enable signal CNT_EN is enabled. The reduction of the ramp signal Vramp can be represented by a negatively sloping, substantially straight line.

Referring again to the embodiment of FIG. 2, the timing controller 410 may provide a count clock signal CLKC, the mode signal MD and a timing signal TM to the A/D conversion unit 300 to control the operation of the A/D conversion unit 300. The count clock signal CLKC may be a signal toggled during the active period where the count enable signal CNT_EN is enabled.

The A/D conversion unit 300 may generate the digital signal DS representing the effective component of the incident light based on the first and second analog signals AS1 and AS2 sequentially provided from the pixel array 100.

The column driver 430 may sequentially output the digital signals DS, which are received from the A/D conversion unit 300 and correspond to one row, based on a second internal control signal ICON2 received from the timing controller 410. The digital signals DS sequentially output from the column driver 430 may be provided to a digital signal processor.

Figure 5:
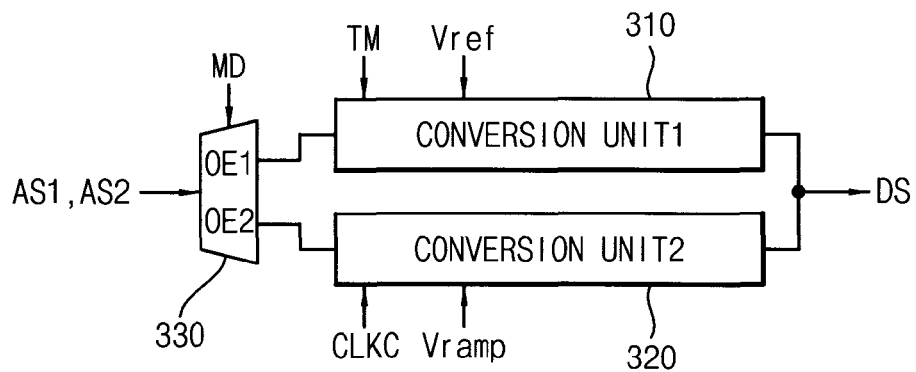
FIG. 5 is a block diagram illustrating an embodiment of an analog-digital conversion unit shown in FIG. 2.

FIG. 5 is a block diagram illustrating an example embodiment of the A/D conversion unit 300 shown in FIG. 2, referred to as the A/D conversion unit 300a. The A/D conversion unit 300a may include a first conversion unit 310, a second conversion unit 320 and a demultiplexer 330.

In the case of the A/D conversion unit 300a illustrated in FIG. 5, the first conversion unit 310, which performs the digital conversion with respect to the first and second analog signals AS1 and AS2 in the first operation mode, may be separated from the second conversion unit 320, which performs the digital conversion with respect to the first and second analog signals AS1 and AS2 in the second operation mode.

The demultiplexer 330 may output the first and second analog signals AS1 and AS2 through one of first and second output terminals OE1 and OE2 based on the mode signal MD. For instance, when the mode signal MD has the first logic level, the demultiplexer 330 may output the first and second analog signals AS1 and AS2 through the first output terminal OE1. In addition, when the mode signal MD has the second logic level, the demultiplexer 330 may output the first and second analog signals AS1 and AS2 through the second output terminal OE2.

In the first operation mode, the first conversion unit 310 may receive the first and second analog signals AS1 and AS2 from the demultiplexer 330 and may generate the digital signal DS by sequentially performing the sigma-delta A/D conversion and the cyclic A/D conversion with respect to the first and second analog signals AS1 and AS2, respectively, by using the reference signal Vref based on the timing signal TM.

In the second operation mode, the second conversion unit 320 may receive the first and second analog signals AS1 and AS2 from the demultiplexer 330 and may generate the digital signal DS by performing the single-slope A/D conversion with respect to the first and second analog signals AS1 and AS2, respectively, by using the count clock signal CLKC and the ramp signal Vramp.

Figure 6:
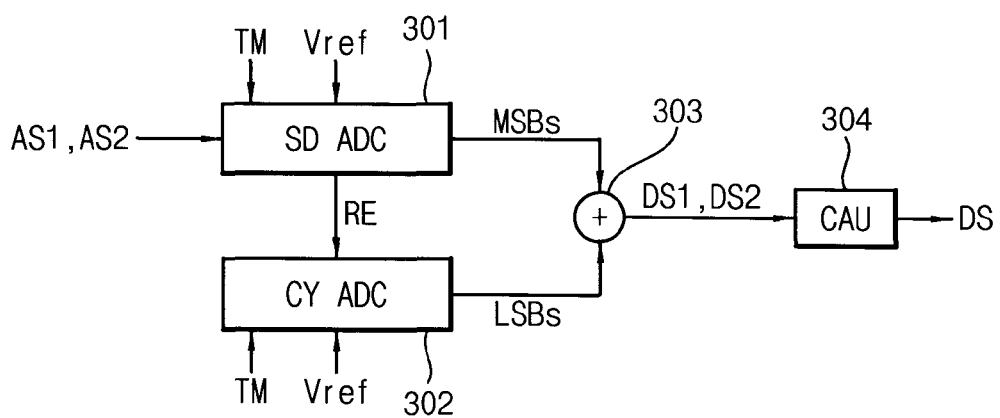
FIG. 6 is a schematic view useful to explain an embodiment of an operation of a first conversion unit shown in FIG. 5.

FIG. 6 is a schematic view used to explain an example embodiment of an operation of the first conversion unit shown in FIG. 5.

Referring to the embodiment of FIG. 6, the first conversion unit 310a may include a sigma-delta A/D converter 301, a cyclic A/D converter 302, an adder 303, and a calculation unit (CAU) 304.

When the first analog signal AS1 is received in the sigma-delta A/D converter 301, the sigma-delta A/D converter 301 may generate most significant bits MSBs and residues RE by performing the sigma-delta A/D conversion with respect to the first analog signal AS1 using the reference signal Vref during a first time period where the timing signal TM has the first logic level.

The cyclic A/D converter 302 may generate least significant bits LSBs by performing the cyclic A/D conversion with respect to the residues RE using the reference signal Vref during a second time period where the timing signal TM has the second logic level.

The adder 303 may generate a first digital signal DS1 by combining the most significant bits MSBs and the least significant bits LSBs.

Meanwhile, when the second analog signal AS2 is received in the sigma-delta A/D converter 301, the sigma-delta A/D converter 301 may generate the most significant bits MSBs and residues RE by performing the sigma-delta A/D conversion with respect to the second analog signal AS2 using the reference signal Vref during the first time period where the timing signal TM has the first logic level.

The cyclic A/D converter 302 may generate the least significant bits LSBs by performing the cyclic A/D conversion with respect to the residues RE using the reference signal Vref during the second time period where the timing signal TM has the second logic level.

The adder 303 may generate a second digital signal DS2 by combining the most significant bits MSBs and the least significant bits LSBs.

The calculation unit 304 may generate the digital signal DS by subtracting the first digital signal DS1 from the second digital signal DS2.

Figure 7:
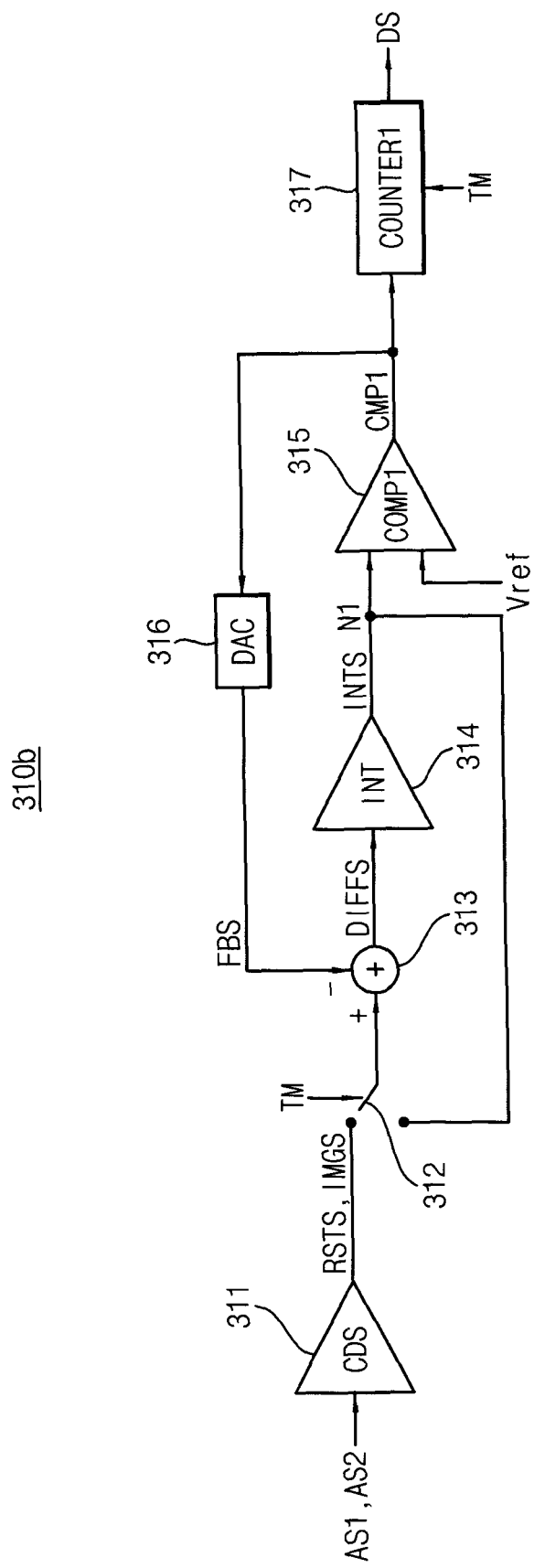
FIG. 7 is a block diagram illustrating an embodiment of a first conversion unit shown in FIG. 5.

FIG. 7 is a block diagram illustrating an example embodiment of the first conversion unit shown in FIG. 5.

Referring to the embodiment of FIG. 7, the first conversion unit 310b may include a correlated double sampling unit (CDS) 311, a switch 312, a subtractor 313, an integrator 314, a first comparator 315, a digital-analog converter 316, and a first counter 317.

The correlated double sampling unit 311 may generate a reset signal RSTS and an image signal IMGS by performing the correlated double sampling with respect to the first and second analog signals AS1 and AS2, respectively.

Figure 8:
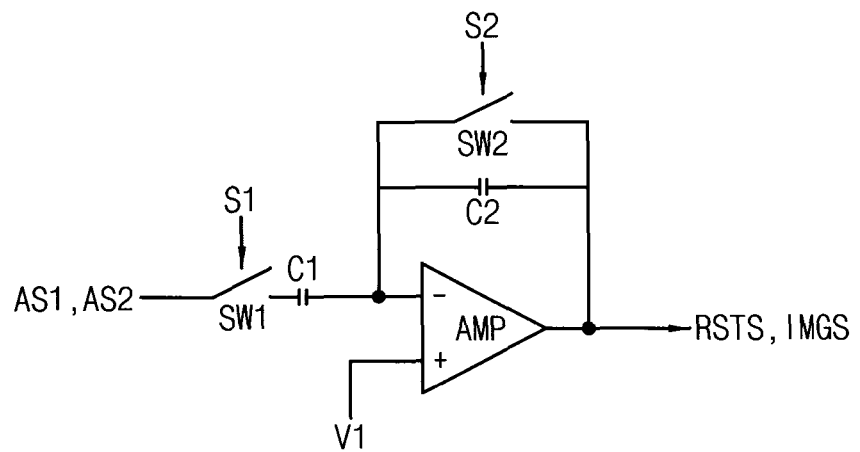
FIG. 8 is a circuit diagram illustrating an embodiment of a correlated double sampling unit shown in FIG. 7.

FIG. 8 is a circuit diagram illustrating an example embodiment of the correlated double sampling unit shown in FIG. 7.

Referring to the embodiment of FIG. 8, the correlated double sampling unit 311 may include an amplifier AMP, a first capacitor C1, a second capacitor C2, a first switch SW1 and a second switch SW2.

The amplifier AMP may be implemented as an operational amplifier. Thus, an offset voltage Voffset may exist in the amplifier AMP.

The first switch SW1 may control the supply of the first and second analog signals AS1 and AS2 to the first capacitor C1 based on a first switch signal S1.

The first capacitor C1 is connected between the first switch SW1 and a negative input terminal of the amplifier AMP to sample the first analog signal AS1 or the second analog signal AS2.

The second switch SW2 may be connected between a first input terminal of the amplifier AMP and an output terminal of the amplifier AMP and turned on/off based on a second switch signal S2. The second capacitor C2 may be connected to the second switch SW2 in parallel.

A first voltage V1 may be applied to a positive input terminal of the amplifier AMP. The correlated double sampling unit 311 may determine the voltage level of the reset signal RSTS based on the first voltage V1.

Hereinafter, an embodiment of the operation of the correlated double sampling unit 311 illustrated in FIG. 8 will be described.

The first and second switches SW1 and SW2 are turned on in response to the first and second switch signals S1 and S2, respectively, while the first analog signal AS1 is being received from the pixel array 100, so the first capacitor C1 may be charged with the first analog signal AS1 and the second capacitor C2 may be discharged. Then, the first and second switches SW1 and SW2 are turned off in response to the first and second switch signals S1 and S2, respectively, so that the amplifier AMP may output a voltage (V1+Voffset) corresponding to the sum of the first voltage V1 and the offset voltage Voffset of the amplifier AMP as the reset signal RSTS.

After that, the first switch SW1 is turned on in response to the first switch signal S1 while the second analog signal AS2 is being received from the pixel array 100, so the first capacitor C1 may be charged with a voltage VD corresponding to the difference between the first and second analog signals AS1 and AS2. Then, the first switch SW1 is turned off in response to the first switch signal S1 so that the amplifier AMP may output a voltage (V1+Voffset+VD) corresponding to the sum of the reset signal RSTS and the voltage VD charged in the first capacitor C1 as the image signal IMGS.

Since each of the unit pixels included in the pixel array 100 has their own pixel property or logic property to output the analog signal AS, the amplitude of the analog signal AS generated from the unit pixels may be different from each other.

As described above, the correlated double sampling unit 311 generates the reset signal RSTS having the amplitude determined based on the amplitude of the first voltage V1 and the offset voltage of the amplifier AMP regardless of the amplitude of the first analog signal AS1, so that the variation in amplitude of the first analog signal AS1 generated from the unit pixels can be removed.

Referring again to the embodiment of FIG. 7, the switch 312 may be selectively connected to one of an output terminal of the correlated double sampling unit 311 and a first node N1. For instance, the switch 312 may provide the reset signal RSTS or the image signal IMGS supplied from the correlated double sampling unit 311 to the subtractor 313 during the first time period where the timing signal TM has the first logic level and may provide an integrate signal INTS supplied from the first node N1 to the subtractor 313 during the second time period where the timing signal TM has the second logic level.

The subtractor 313 may generate a differential signal DIFFS by subtracting a feedback signal FBS from a signal supplied through the switch 312. For instance, the subtractor 313 may generate the differential signal DIFFS by subtracting the feedback signal FBS from the reset signal RSTS or the image signal IMGS during the first time period and may generate the differential signal DIFFS by subtracting the feedback signal FBS from the integrate signal INTS during the second time period.

The integrator 314 integrates the differential signal DIFFS to output the integrate signal INTS to the first node N1.

The first comparator 315 may output a first compare signal CMP1 by comparing an amplitude of the integrate signal INTS with an amplitude of the reference signal Vref. For instance, if the integrate signal INTS is equal to or higher than the reference signal Vref, the first comparator 315 may output the first compare signal CMP1 having the logic high level. In addition, if the integrate signal INTS is lower than the reference signal Vref, the first comparator 315 may output the first compare signal CMP1 having the logic low level. Thus, the first compare signal CMP1 may correspond to a digital signal having one bit.

The digital-analog converter 316 may generate the feedback signal FBS by converting the first compare signal CMP1 into an analog signal.

The first counter 317 may generate the digital signal DS based on the first compare signal CMP1. For instance, when the correlated double sampling unit 311 outputs the reset signal RSTS, the first counter 317 may generate the most significant bits of the first digital signal DS1 by summing up the first compare signals CMP1 generated during the first time period where the timing signal TM has the first logic level, and may generate the least significant bits of the first digital signal DS1 by using the first compare signals CMP1 generated during the second time period where the timing signal TM has the second logic level, thereby generating the first digital signal DS1. Meanwhile, when the correlated double sampling unit 311 outputs the image signal IMGS, the first counter 317 may generate the most significant bits of the second digital signal DS2 by summing up the first compare signals CMP1 generated during the first time period where the timing signal TM has the first logic level, and may generate the least significant bits of the second digital signal DS2 by using the first compare signals CMP1 generated during the second time period where the timing signal TM has the second logic level, thereby generating the second digital signal DS2. Then, the first counter 317 may subtract the first digital signal DS1 from the second digital signal DS2 to generate the digital signal DS.

Figure 9:
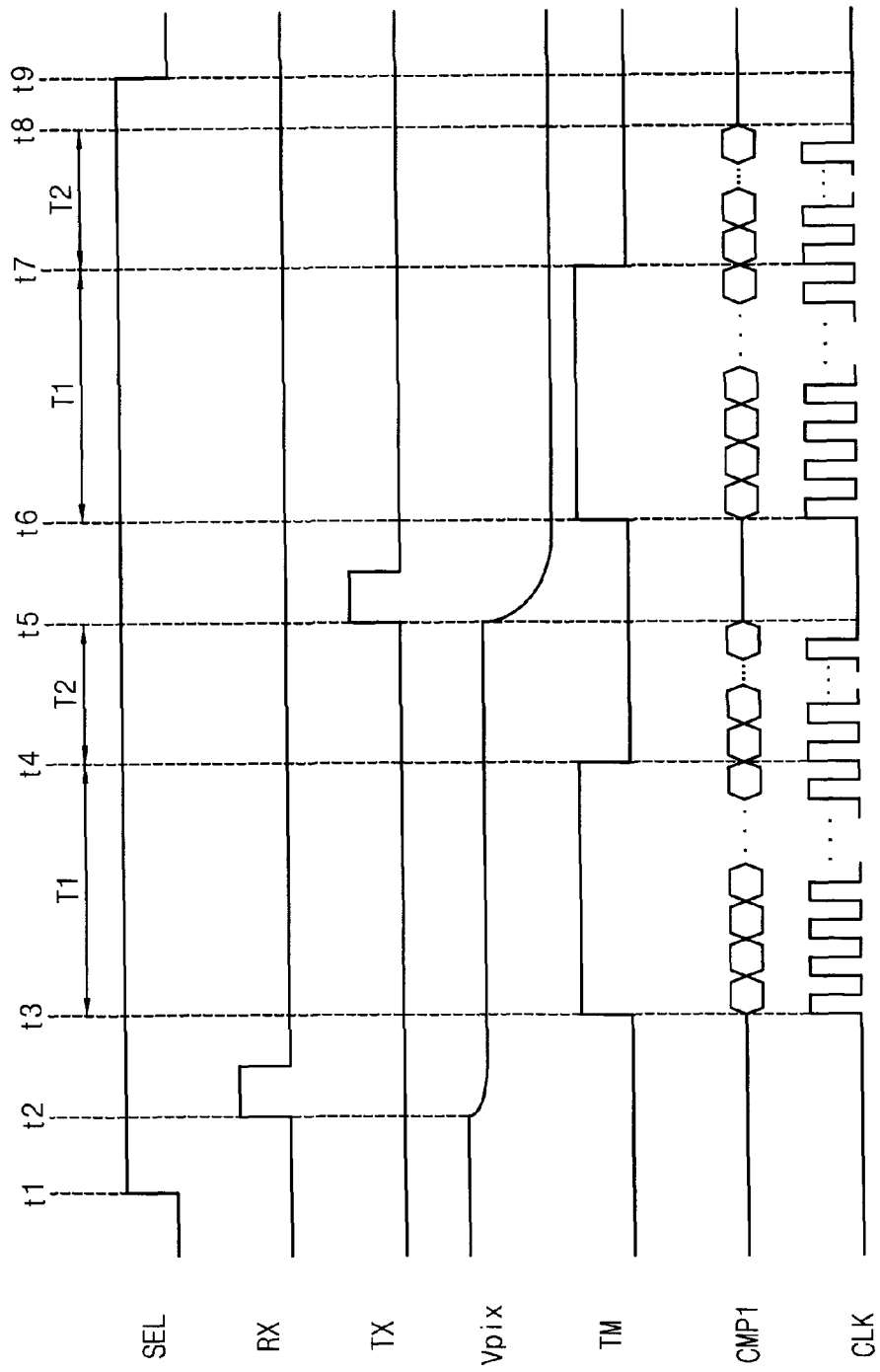
FIG. 9 is a timing chart useful to explain an embodiment of an operation of the first conversion unit shown in FIG. 7.

FIG. 9 is an embodiment of a timing chart used to explain an operation of the first conversion unit shown in the embodiment of FIG. 7.

In the embodiment of FIG. 9, the clock signal CLK may be a signal supplied from the timing controller 410 to the first conversion unit 310b.

Hereinafter, the operation of the image sensor 10 illustrated in the embodiment of FIG. 1 in the first operation mode will be described with reference to FIGS. 1 to 9.

At a time point t1, the row driver 420 supplies the row select signal SEL, which is activated to have the logic high level, to the pixel array 100 to select one of the rows included in the pixel array 100.

At a time point t2, the row driver 420 supplies the reset control signal RX to the selected row. At this time, a pixel voltage signal Vpix output from the pixel array 100 may be the first analog signal AS1 representing the reset component.

At a time point t3, the timing controller 410 provides the timing signal TM having the logic high level to the first conversion unit 310b and the switch 312 provides the reset signal RSTS to the subtractor 313.

The first conversion unit 310b performs the sigma-delta A/D conversion with respect to the reset signal RSTS during the first time period T1 where the timing signal TM has the logic high level. That is, the first comparator 315 may generate the first compare signal CMP1 in every period of the clock signal CLK by comparing the integrate signal INTS, which is obtained by integrating a value acquired by subtracting the feedback signal FBS corresponding to the first compare signal CMP1 of the previous period from the reset signal RSTS, with the reference signal Vref. The first counter 317 may generate the most significant bits MSBs by summing up the first compare signals CMP1 generated during the first period T1. For instance, the first time period T1 may correspond to a period of $2^{\wedge}(n-1)$ (or $2^{n-1}$) clock signals CLK and the most significant bits MSBs may be "n" bits.

At a time point t4, the timing controller 410 provides the timing signal TM having the logic low level to the first conversion unit 310b and the switch 312 provides the integrate signal INTS to the subtractor 313. At the time point t4, the integrate signal INTS output from the integrator 314 may correspond to the residues RE remaining after the most significant bits are generated from the reset signal RSTS.

The first conversion unit 310b performs the cyclic A/D conversion with respect to the residues RE during the second time period T2 where the timing signal TM has the logic low level. That is, the first comparator 315 may generate the first compare signal CMP1 in every period of the clock signal CLK by comparing the integrate signal INTS, which is obtained by integrating a value acquired by subtracting the feedback signal FBS corresponding to the first compare signal CMP1 of the previous period from the integrate signal INTS of the previous period, with the reference signal Vref. The first counter 317 may generate the least significant bits LSBs by using the first compare signals CMP1 generated during the second period T2. For instance, the second time period T2 may correspond to a period of "m" clock signals CLK and the least significant bits LSBs may be "m" bits.

As the second time period T2 is terminated at a time point t5, the first counter 317 can generate the first digital signal DS1 by combining the most significant bits and the least significant bits.

Meanwhile, at the time point t5, the row driver 420 supplies the transfer control signal TX to the selected row. At this time, a pixel voltage signal Vpix output from the pixel array 100 may be the second analog signal AS2 representing the image component according to the incident light.

At a time point t6, the timing controller 410 provides the timing signal TM having the logic high level to the first conversion unit 310b and the switch 312 provides the image signal IMGS to the subtractor 313.

The first conversion unit 310b performs the sigma-delta A/D conversion with respect to the image signal IMGS during the first time period T1 where the timing signal TM has the logic high level. That is, the first comparator 315 may generate the first compare signal CMP1 in every period of the clock signal CLK by comparing the integrate signal INTS, which is obtained by integrating a value acquired by subtracting the feedback signal FBS corresponding to the first compare signal CMP1 of the previous period from the image signal IMGS, with the reference signal Vref. The first counter 317 may generate the most significant bits MSBs by summing up the first compare signals CMP1 generated during the first period T1. For instance, the first time period T1 may correspond to a period of $2^{\wedge}(n-1)$ (or $2^{n-1}$) clock signals CLK and the most significant bits MSBs may be "n" bits.

At a time point t7, the timing controller 410 provides the timing signal TM having the logic low level to the first conversion unit 310b and the switch 312 provides the integrate signal INTS to the subtractor 313. At the time point t4, the integrate signal INTS output from the integrator 314 may correspond to the residues RE remaining after the most significant bits are generated from the image signal IMGS.

The first conversion unit 310b performs the cyclic A/D conversion with respect to the residues RE during the second time period T2 where the timing signal TM has the logic low level. That is, the first comparator 315 may generate the first compare signal CMP1 in every period of the clock signal CLK by comparing the integrate signal INTS, which is obtained by integrating a value acquired by subtracting the feedback signal FBS corresponding to the first compare signal CMP1 of the previous period from the integrate signal INTS of the previous period, with the reference signal Vref. The first counter 317 may generate the least significant bits LSBs by using the first compare signals CMP1 generated during the second period T2. For instance, the second time period T2 may correspond to a period of m clock signals CLK and the least significant bits LSBs may be m bits.

As the second time period T2 is terminated at a time point t8, the first counter 317 can generate the first digital signal DS1 by combining the most significant bits and the least significant bits. The first counter 317 may output the digital signal DS representing the effective component of the incident light by subtracting the first digital signal DS1 from the second digital signal DS2.

At a time point t9, the row driver 420 supplies the row select signal SEL, which is deactivated to have the logic low level, to the pixel array 100 to cancel the selection for the selected row.

After that, the image sensor 10 repeats the above operation with respect to other rows to output the digital signal DS in a unit of row.

As described above, the first conversion unit 310b can generate an image having a high resolution through the over sampling ratio (OSR) in the first operation mode (that is, still image photography mode). Thus, the image sensor 10 can effectively reduce noise and increase the signal-to-noise ratio (SNR) in the still image photography mode.

Figure 10:
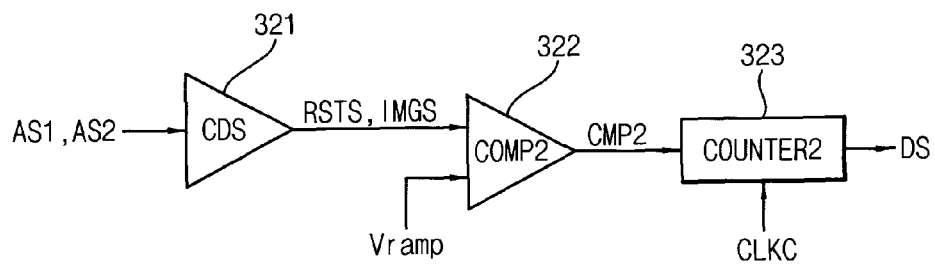
FIG. 10 is a block diagram illustrating an embodiment of a second conversion unit shown in FIG. 5.

FIG. 10 is a block diagram illustrating an example embodiment of the second conversion unit shown in the embodiment of FIG. 5.

Referring to the embodiment of FIG. 10, the second conversion unit 320a may include a correlated double sampling unit (CDS) 321, a second comparator 322, and a second counter 323.

The correlated double sampling unit 321 may generate a reset signal RSTS and an image signal IMGS by performing the correlated double sampling with respect to the first and second analog signals AS1 and AS2, respectively.

The correlated double sampling unit 321 included in the second conversion unit 320a may be identical to the correlated double sampling unit 311 included in the first conversion unit 310b illustrated in FIG. 7. Since the structure and operation of the correlated double sampling unit 311 have been described above with reference to the embodiments of FIGS. 7 and 8, a detailed description for the correlated double sampling unit 321 will be omitted below.

The second comparator 322 may output a second compare signal CMP2 by comparing amplitudes of the reset signal RSTS and the image signal IMGS with an amplitude of the ramp signal Vramp. For instance, if the reset signal RSTS or the image signal IMGS is lower than the ramp signal Vramp, the second comparator 322 may output the second compare signal CMP2 having the logic high level. In addition, if the reset signal RSTS or the image signal IMGS is equal to or higher than the ramp signal Vramp, the second comparator 322 may output the second compare signal CMP2 having the logic low level.

The second counter 323 may generate the digital signal DS based on the second compare signal CMP2 and the count clock signal CLK. For instance, when the correlated double sampling unit 321 outputs the reset signal RSTS, the second counter 323 may generate a first count value by performing the counting operation in synchronization with the count clock signal CLK until the second compare signal CMP2 is transited to the logic low level. In addition, when the correlated double sampling unit 321 outputs the image signal IMGS, the second counter 323 may generate a second count value by performing the counting operation in synchronization with the count clock signal CLK until the second compare signal CMP2 is transited to the logic low level. Then, the second counter 323 may generate the digital signal DS by subtracting the first count value from the second count value.

Figure 11:
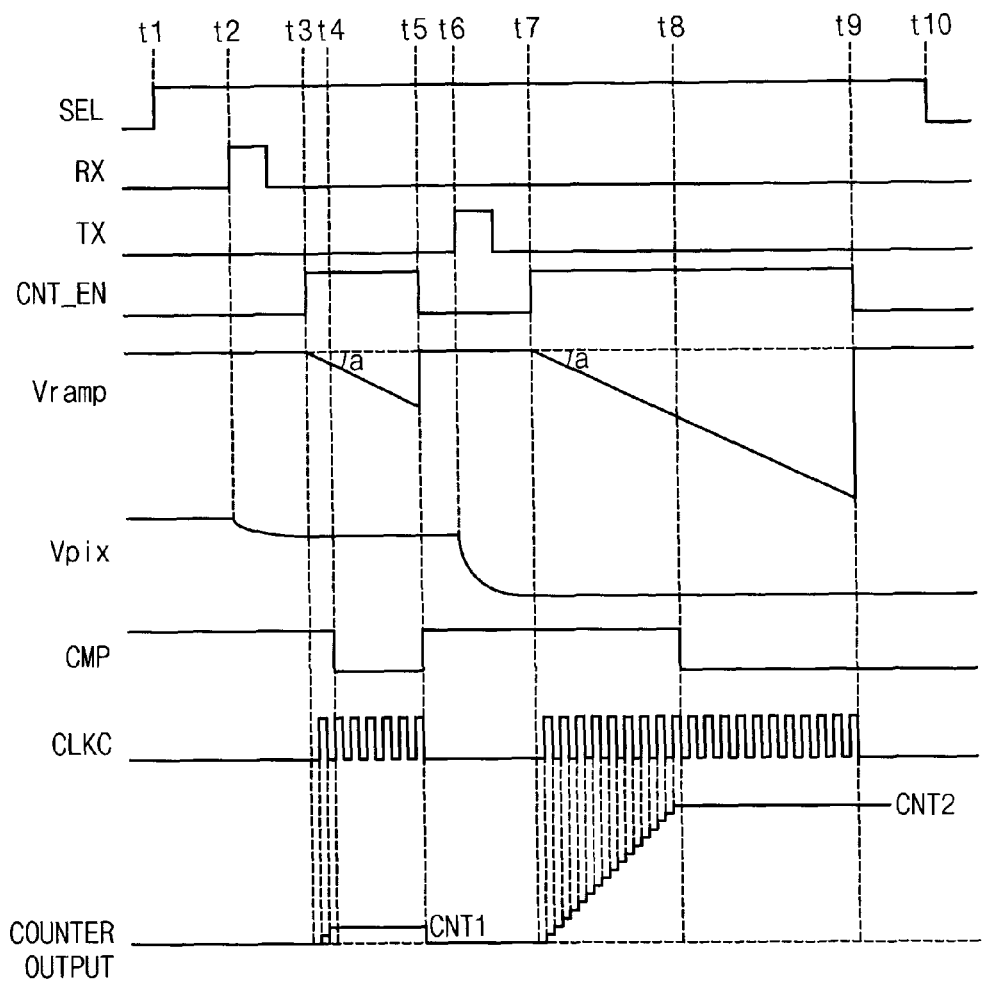
FIG. 11 is a timing chart useful to explain an embodiment of an operation of the second conversion unit shown in FIG. 10.

FIG. 11 is an embodiment of a timing chart used to explain an operation of the second conversion unit shown in the embodiment of FIG. 10.

Hereinafter, the operation of the image sensor 10 illustrated in the embodiment of FIG. 1 in the second operation mode will be described with reference to FIGS. 1 to 11.

At a time point t1, the row driver 420 supplies the row select signal SEL, which is activated to have the logic high level, to the pixel array 100 to select one of the rows included in the pixel array 100.

At a time point t2, the row driver 420 supplies the reset control signal RX to the selected row. At this time, a pixel voltage signal Vpix output from the pixel array 100 may be the first analog signal AS1 representing the reset component.

At a time point t3, the timing controller 410 provides the count enable signal CNT_EN having the logic high level to the reference signal generating unit 200 and the reference signal generating unit 200 starts to reduce the voltage level of the ramp signal Vramp at a constant slope (a), here a negative slope. In addition, the timing controller 410 provides the count clock signal CLKC to the second counter 323 and the second counter 323 performs the counting operation in synchronization with the count clock signal CLKC.

At a time point t4, the ramp signal Vramp and the reset signal RSTS have the same voltage level and the second compare signal CMP2 output from the second comparator 322 is transited into the logic low level so that the counting operation is terminated. At this time, the second counter 323 generates a first count value CNT1 corresponding to the reset signal RSTS. In the embodiment of FIG. 11, the first count value CNT1 is 2.

At a time point t5, if the count enable signal CNT_EN is deactivated to have the logic low level, the reference signal generating unit 200 is disabled. The period from the time point t3 to the time point t5 may represent the maximum period to count the reset signal RSTS and can be appropriately set corresponding to the number of clock cycles according to the characteristics of the image sensor 10.

At a time point t6, the row driver 420 supplies the transfer control signal TX to the selected row. At this time, a pixel voltage signal Vpix output from the pixel array 100 may be the second analog signal AS2 representing the image component.

At a time point t7, the timing controller 410 provides again the count enable signal CNT_EN having the logic high level to the reference signal generating unit 200 and the reference signal generating unit 200 starts to reduce the voltage level of the ramp signal Vramp at a constant slope (a) identical to the slope in the time point t3. In addition, the timing controller 410 provides the count clock signal CLKC to the second counter 323 and the second counter 323 performs the counting operation in synchronization with the count clock signal CLKC.

At a time point t8, the ramp signal Vramp and the image signal IMGS have the same voltage level and the second compare signal CMP2 output from the second comparator 322 is transited into the logic low level so that the counting operation is terminated. At this time, the second counter 323 generates a second count value CNT2 corresponding to the image signal IMGS. In the embodiment of FIG. 11, the second count value CNT2 is 17. The second counter 322 may output the digital signal DS representing the effective component of the incident light by subtracting the first count value CNT1 from the second count value CNT2.

At a time point t9, if the count enable signal CNT_EN is deactivated to have the logic low level, the reference signal generating unit 200 is disabled. The period from the time point t7 to the time point t9 may represent the maximum period to count the image signal IMGS and can be appropriately set corresponding to the number of clock cycles according to the characteristics of the image sensor 10.

At a time point t10, the row driver 420 supplies the row select signal SEL, which is deactivated to have the logic low level, to the pixel array 100 to cancel the selection for the selected row.

After that, the image sensor 10 repeats the above operation with respect to other rows to output the digital signal DS in a unit of row.

In the second operation mode (that is, dynamic image video mode), since the image having a relatively low resolution with a relatively high frame rate must be provided, the A/D conversion must be performed at a high rate. Therefore, if the A/D conversion is performed by using the first conversion unit 310b of FIG. 7 in the dynamic image video mode, the OSR (over sampling ratio) may be lowered so that the signal-to-noise ratio (SNR) may be reduced.

However, the image sensor 10 according to example embodiments generates the digital signal DS through the second conversion unit 320a that performs the single-slope A/D conversion in the second operation mode (that is, dynamic image video mode). Therefore, the image sensor 10 can provide the image having the high SNR with the high frame rate in the dynamic image video mode.

As described above with reference to FIGS. 1 to 11, the image sensor 10 according to example embodiments includes two mutually different A/D conversion units so that the image sensor 10 performs the sigma-delta A/D conversion and the cyclic A/D conversion with the high over sampling rate in the first operation mode (that is, still image photography mode) to generate the still image having the relatively high resolution, and performs the single-slope A/D conversion in the second operation mode (that is, dynamic image video mode) to generate the dynamic image having the relatively low resolution with the high frame rate. Thus, the image sensor 10 can provide the high-quality image having the high signal-to-noise ratio in the still image photography mode and the dynamic image video mode.

Figure 12:
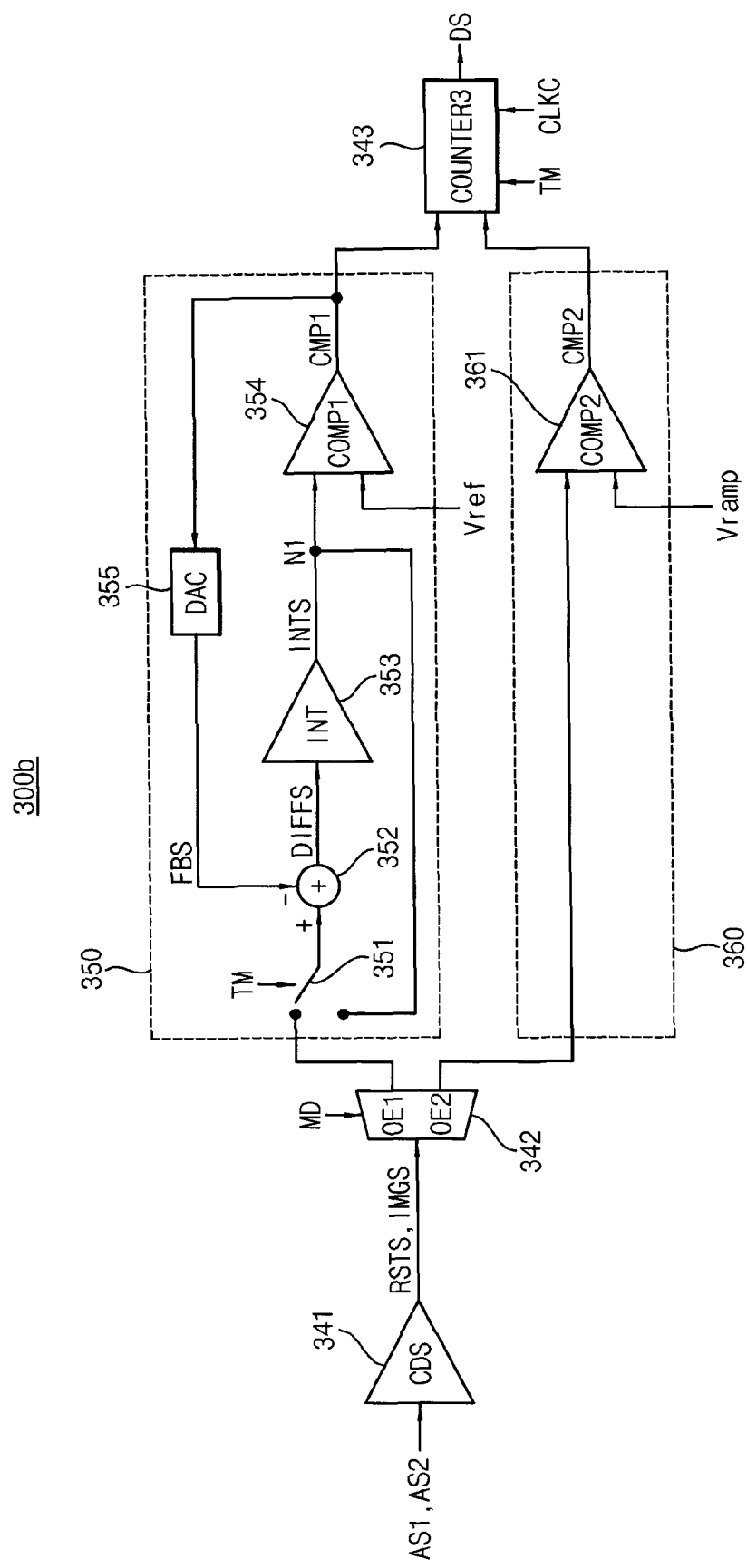
FIG. 12 is a block diagram illustrating another embodiment of the analog-to-digital (A/D) conversion unit shown in FIG. 2.

FIG. 12 is an embodiment of a block diagram illustrating another example of the A/D conversion unit shown in the embodiment of FIG. 2.

Referring to FIG. 12, the A/D conversion unit 300b includes a correlated double sampling unit 341, a demultiplexer 342, a first conversion circuit 350, a second conversion circuit 360, and a third counter 343.

The A/D conversion unit 300b of the embodiment of FIG. 12 may have the structure corresponding to the structure of the A/D conversion unit 300a of FIG. 5 where the first conversion unit 310 and the second conversion unit 320 of the A/D conversion unit 300a share the correlated double sampling units 311 and 321 and the counters 317 and 323.

The correlated double sampling unit 341 may generate a reset signal RSTS and an image signal IMGS by performing the correlated double sampling with respect to the first and second analog signals AS1 and AS2, respectively.

The correlated double sampling unit 341 included in the A/D conversion unit 300b may be identical to the correlated double sampling unit 311 included in the first conversion unit 310b illustrated in FIG. 7. Since the structure and operation of the correlated double sampling unit 311 have been described above with reference to FIGS. 7 and 8, the detailed description for the correlated double sampling unit 341 will be omitted below.

The demultiplexer 342 may output the reset signal RSTS and the image signal IMGS through one of first and second output terminals OE1 and OE2 based on the mode signal MD. For instance, when the mode signal MD has the first logic level, the demultiplexer 342 may output the reset signal RSTS and the image signal IMGS through the first output terminal OE1. In addition, when the mode signal MD has the second logic level, the demultiplexer 342 may output the reset signal RSTS and the image signal IMGS through the second output terminal OE2.

The first conversion circuit 350 may generate the first compare signal CMP1 based on a value, which is obtained by integrating a signal received through the first output terminal OE1 of the demultiplexer 342, and the reference signal Vref.

The first conversion circuit 350 may include a switch 351, a subtractor 352, an integrator 353, a first comparator 354 and a digital-analog converter 355.

The switch 351 may be selectively connected to one of the first output terminal OE1 of the demultiplexer 342 and a first node N1. For instance, the switch 351 may provide the reset signal RSTS or the image signal IMGS supplied from the first output terminal OE1 of the demultiplexer 342 to the subtractor 352 during the first time period where the timing signal TM has the first logic level and may provide an integrate signal INTS supplied from the first node N1 to the subtractor 352 during the second time period where the timing signal TM has the second logic level.

The subtractor 352 may generate a differential signal DIFFS by subtracting a feedback signal FBS from a signal supplied through the switch 351. For instance, the subtractor 352 may generate the differential signal DIFFS by subtracting the feedback signal FBS from the reset signal RSTS or the image signal IMGS during the first time period and may generate the differential signal DIFFS by subtracting the feedback signal FBS from the integrate signal INTS during the second time period.

The integrator 353 integrates the differential signal DIFFS to output the integrate signal INTS to the first node N1.

The first comparator 354 may output the first compare signal CMP1 by comparing an amplitude of the integrate signal INTS with an amplitude of the reference signal Vref. For instance, if the integrate signal INTS is equal to or higher than the reference signal Vref, the first comparator 354 may output the first compare signal CMP1 having the logic high level. In addition, if the integrate signal INTS is lower than the reference signal Vref, the first comparator 354 may output the first compare signal CMP1 having the logic low level. Thus, the first compare signal CMP1 may correspond to a digital signal having one bit.

The digital-analog converter 355 may generate the feedback signal FBS by converting the first compare signal CMP1 into an analog signal.

The second conversion circuit 360 may generate the second compare signal CMP2 based on a signal received through the second output terminal OE2 of the demultiplexer 342 and the ramp signal Vramp.

The second conversion circuit 360 may include a second comparator 361.

The second comparator 361 may output the second compare signal CMP2 by comparing an amplitude of the reset signal RSTS and the image signal IMGS with an amplitude of the ramp signal Vramp. For instance, if the reset signal RSTS or the image signal IMGS is lower than the ramp signal Vramp, the second comparator 361 may output the second compare signal CMP2 having the logic high level. In addition, if the reset signal RSTS or the image signal IMGS is equal to or higher than the ramp signal Vramp, the second comparator 361 may output the second compare signal CMP2 having the logic low level.

When the first compare signal CMP1 is received in the third counter 343, the third counter 343 may generate the digital signal DS based on the first compare signal CMP1 and the reference signal Vref. In addition, when the second compare signal CMP2 is received in the third counter 343, the third counter 343 may generate the digital signal DS based on the second compare signal CMP2 and the ramp signal Vramp.

In the first operation mode, when the correlated double sampling unit 341 outputs the reset signal RSTS, the third counter 343 may generate the most significant bits of the first digital signal DS1 by summing up the first compare signals CMP1 generated during the first time period where the timing signal TM has the first logic level, and may generate the least significant bits of the first digital signal DS1 by using the first compare signals CMP1 generated during the second time period where the timing signal TM has the second logic level, thereby generating the first digital signal DS1. Meanwhile, when the correlated double sampling unit 341 outputs the image signal IMGS, the third counter 343 may generate the most significant bits of the second digital signal DS2 by summing up the first compare signals CMP1 generated during the first time period where the timing signal TM has the first logic level, and may generate the least significant bits of the second digital signal DS2 by using the first compare signals CMP1 generated during the second time period where the timing signal TM has the second logic level, thereby generating the second digital signal DS2. Then, the third counter 343 may subtract the first digital signal DS1 from the second digital signal DS2 to generate the digital signal DS.

In the second operation mode, when the correlated double sampling unit 341 outputs the reset signal RSTS, the third counter 343 may generate a first count value by performing the counting operation in synchronization with the count clock signal CLK until the second compare signal CMP2 is transited to the logic low level. In addition, when the correlated double sampling unit 341 outputs the image signal IMGS, the third counter 343 may generate a second count value by performing the counting operation in synchronization with the count clock signal CLK until the second compare signal CMP2 is transited to the logic low level. Then, the third counter 343 may generate the digital signal DS by subtracting the first count value from the second count value.

As described above with reference to FIG. 12, the A/D conversion unit 300b commonly uses the correlated double sampling unit 341 and the third counter 343 in the first and second operation modes, so the size of the A/D conversion unit 300b may be reduced as compared with the size of the A/D conversion unit 300a.

Figure 13:
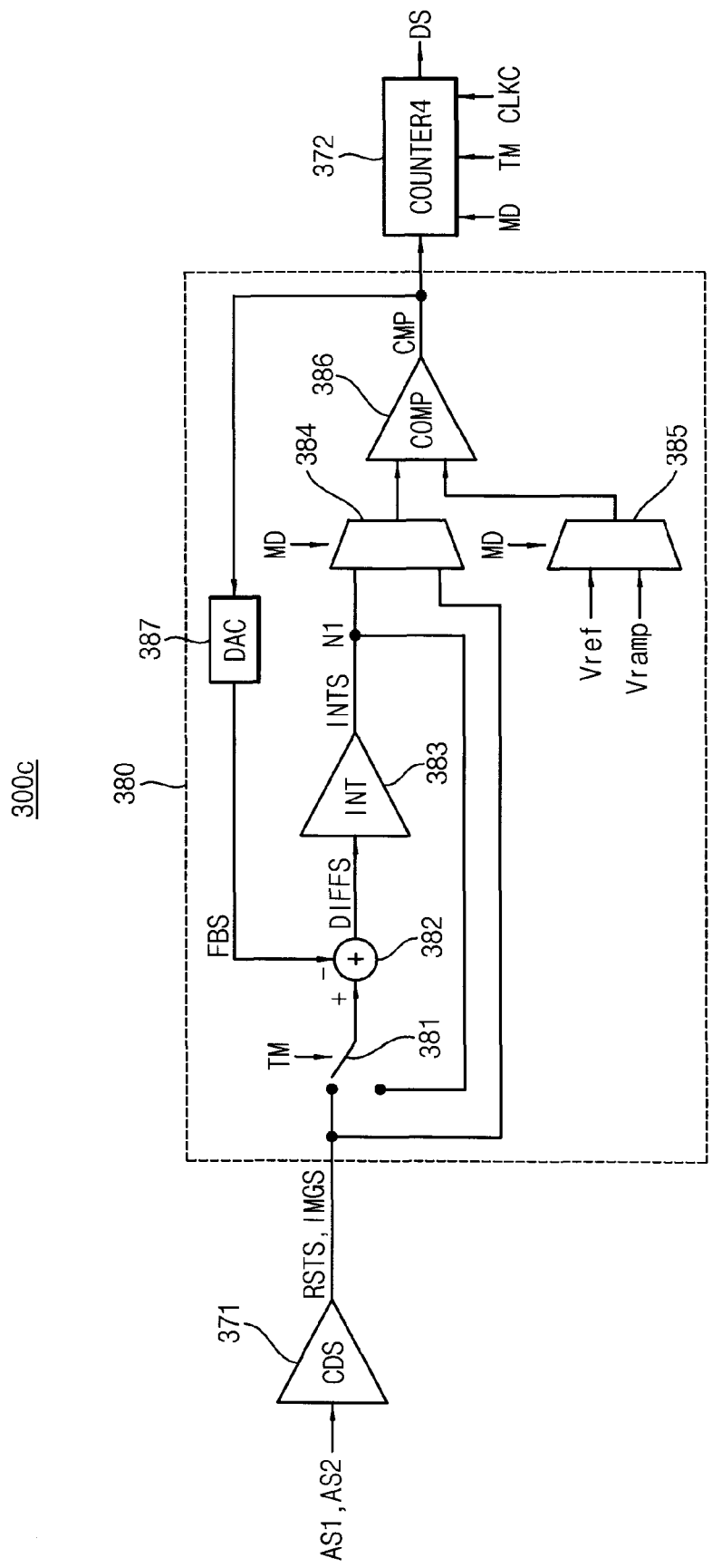
FIG. 13 is a block diagram illustrating still another embodiment of the analog-to-digital (A/D) conversion unit shown in FIG. 2.

FIG. 13 is a block diagram illustrating still another example embodiment of the A/D conversion unit shown in the embodiment of FIG. 2.

Referring to the embodiment of FIG. 13, the A/D conversion unit 300c includes a correlated double sampling unit 371, a third conversion circuit 380, and a fourth counter 372.

The A/D conversion unit 300c of FIG. 13 may have the structure corresponding to the structure of the A/D conversion unit 300a of FIG. 5 where the first conversion unit 310 and the second conversion unit 320 of the A/D conversion unit 300a share the correlated double sampling units 311 and 321, the counters 317 and 323 and the comparators 315 and 322.

The correlated double sampling unit 371 may generate a reset signal RSTS and an image signal IMGS by performing the correlated double sampling with respect to the first and second analog signals AS1 and AS2, respectively.

The correlated double sampling unit 371 included in the A/D conversion unit 300c may be identical to the correlated double sampling unit 311 included in the first conversion unit 310b illustrated in FIG. 7. Since the structure and operation of the correlated double sampling unit 311 have been described above with reference to FIGS. 7 and 8, the detailed description for the correlated double sampling unit 371 will be omitted below.

In the first operation mode, the third conversion circuit 380 may generate the compare signal CMP based on a value, which is obtained by integrating the reset signal RSTS or the image signal IMGS, and the reference signal Vref. In the second operation mode, the third conversion circuit 380 may generate the compare signal CMP based on the reset signal RSTS or the image signal IMGS and the ramp signal Vramp.

The third conversion circuit 380 may include a switch 381, a subtractor 382, an integrator 383, a first multiplexer 384, a second multiplexer 385, a comparator 386, and a digital-analog converter 387, in this embodiment.

The switch 381 may be selectively connected to one of the output terminal of the correlated double sampling unit 371 and a first node N1. For instance, the switch 381 may provide the reset signal RSTS or the image signal IMGS supplied from the output terminal of the correlated double sampling unit 371 to the subtractor 382 during the first time period where the timing signal TM has the first logic level and may provide an integrate signal INTS supplied from the first node N1 to the subtractor 382 during the second time period where the timing signal TM has the second logic level.

The subtractor 382 may generate a differential signal DIFFS by subtracting a feedback signal FBS from a signal supplied through the switch 381. For instance, the subtractor 382 may generate the differential signal DIFFS by subtracting the feedback signal FBS from the reset signal RSTS or the image signal IMGS during the first time period and may generate the differential signal DIFFS by subtracting the feedback signal FBS from the integrate signal INTS during the second time period.

The integrator 383 integrates the differential signal DIFFS to output the integrate signal INTS to the first node N1.

The first multiplexer 384 may output one of the integrate signal INTS and the output signal of the correlated double sampling unit 371 based on the mode signal MD. For instance, when the mode signal MD has the first logic level, the first multiplexer 384 may output the integrate signal INTS. In addition, when the mode signal MD has the second logic level, the first multiplexer 384 may output the reset signal RSTS or the image signal IMGS supplied from the correlated double sampling unit 371.

The second multiplexer 385 may output one of the reference signal Vref and the ramp signal Vramp based on the mode signal MD. For instance, when the mode signal MD has the first logic level, the second multiplexer 385 may output the reference signal Vref. In addition, when the mode signal MD has the second logic level, the second multiplexer 385 may output the ramp signal Vramp.

The comparator 386 may generate the compare signal CMP by comparing an amplitude of the output signal of the first multiplexer 384 with an amplitude of the output signal of the second multiplexer 385.

The digital-analog converter 387 may generate the feedback signal FBS by converting the compare signal CMP1 into an analog signal.

The fourth counter 372 may generate the digital signal DS based on the mode signal MD, the timing signal TM, the compare signal CMP and the count clock signal CLKC.

In the first operation mode where the mode signal MD has the first logic level, when the correlated double sampling unit 371 outputs the reset signal RSTS, the fourth counter 372 may generate the most significant bits of the first digital signal DS1 by summing up the compare signals CMP generated during the first time period where the timing signal TM has the first logic level, and may generate the least significant bits of the first digital signal DS1 by using the compare signals CMP generated during the second time period where the timing signal TM has the second logic level, thereby generating the first digital signal DS1. Meanwhile, when the correlated double sampling unit 371 outputs the image signal IMGS, the fourth counter 372 may generate the most significant bits of the second digital signal DS2 by summing up the compare signals CMP generated during the first time period where the timing signal TM has the first logic level, and may generate the least significant bits of the second digital signal DS2 by using the compare signals CMP generated during the second time period where the timing signal TM has the second logic level, thereby generating the second digital signal DS2. Then, the fourth counter 372 may subtract the first digital signal DS1 from the second digital signal DS2 to generate the digital signal DS.

In the second operation mode where the mode signal MD has the first logic level, when the correlated double sampling unit 371 outputs the reset signal RSTS, the fourth counter 372 may generate a first count value by performing the counting operation in synchronization with the count clock signal CLK until the compare signal CMP is transited to the logic low level. In addition, when the correlated double sampling unit 371 outputs the image signal IMGS, the fourth counter 372 may generate a second count value by performing the counting operation in synchronization with the count clock signal CLK until the compare signal CMP is transited to the logic low level. Then, the fourth counter 372 may generate the digital signal DS by subtracting the first count value from the second count value.

As described above with reference to the embodiment of FIG. 13, the A/D conversion unit 300c commonly uses the correlated double sampling unit 371, the comparator 386 and the fourth counter 372 in the first and second operation modes, so the size of the A/D conversion unit 300c may be reduced as compared with the size of the A/D conversion unit 300a.

Figure 14:
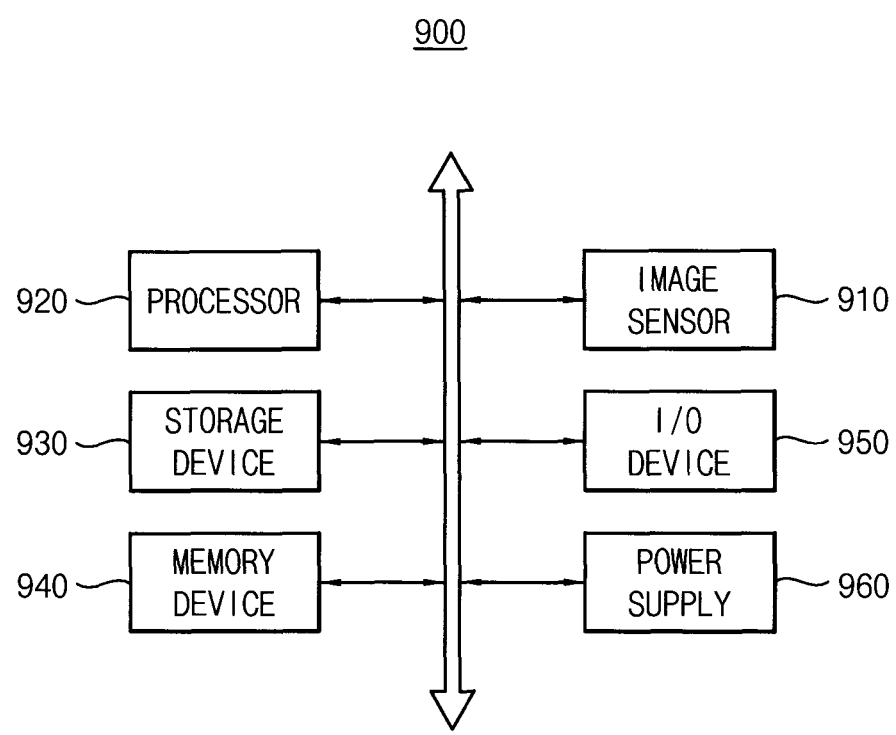
FIG. 14 is a block diagram illustrating an embodiment of a computing system including an image sensor according to aspects of the inventive concepts.

FIG. 14 is a block diagram illustrating an embodiment of a computing system including an image sensor according to aspects of the present invention.

Referring to the embodiment of FIG. 14, a computing system 900 may include an image sensor 910, a processor 920, and a storage device 930.

The image sensor 910 may generate a digital signal corresponding to an incident light. The storage device 930 may store the digital signal. The processor 920 may control operations of the image sensor 910 and the storage device 930.

The computing system 900 may further include a memory device 940, an input/output device 950 and a power supply 960. Although it is not illustrated in FIG. 14, the computing system 900 may further include ports that communicate with a video card, a sound card, a memory card, a universal serial bus (USB) device, or other electronic devices, as would be understood by those skilled in the art having the benefit of this disclosure.

The processor 920 may perform various calculations or tasks. According to some embodiments, the processor 920 may be a microprocessor or a CPU. The processor 920 may communicate with the storage device 930, the memory device 940 and the input/output device 950 via an address bus, a control bus, and/or a data bus. In some example embodiments, the processor 920 may be coupled to an extended bus, such as a peripheral component interconnection (PCI) bus.

The storage device 930 may include a non-volatile memory device such as a flash memory device, a solid state drive (SSD), a hard disk drive (HDD), a compact disk read-only memory (CD-ROM) drive, etc., as examples.

The memory device 940 may store data required for an operation of the electronic device 900. The memory device 940 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc., as examples.

The input/output device 950 may include a keyboard, a mouse, a printer, a display device, etc., as examples. The power supply 960 may supply operational power.

The image sensor 910 may be connected to the processor 920 through one or more of the above buses or other communication links to communicate with the processor 920. The image sensor 910 may include a pixel array that detects incident light to generate an analog signal, and an A/D conversion unit that performs a sigma-delta A/D conversion and a cyclic A/D conversion with respect to the analog signal to generate a digital signal in a first operation mode and performs a single-slope A/D conversion with respect to the analog signal to generate the digital signal in a second operation mode.

The image sensor 910 may be embodied with the image sensor 10 of FIG. 1. Embodiments of a structure and an operation of the image sensor 10 of FIG. 1 are described above with reference to FIGS. 1 to 13. Therefore, a detail description of the image sensor 910 will be omitted.

The image sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP), as examples.

According to example embodiments, the image sensor 910 may be integrated with the processor 920 in one chip, or the image sensor 910 and the processor 920 may be implemented as separate chips.

The computing system 900 may be any computing system using an image sensor. For example, the computing system 900 may include a digital camera, a mobile phone, a smart phone, a portable multimedia player (PMP), a personal digital assistant (PDA), a tablet, etc., as examples.

Figure 15:
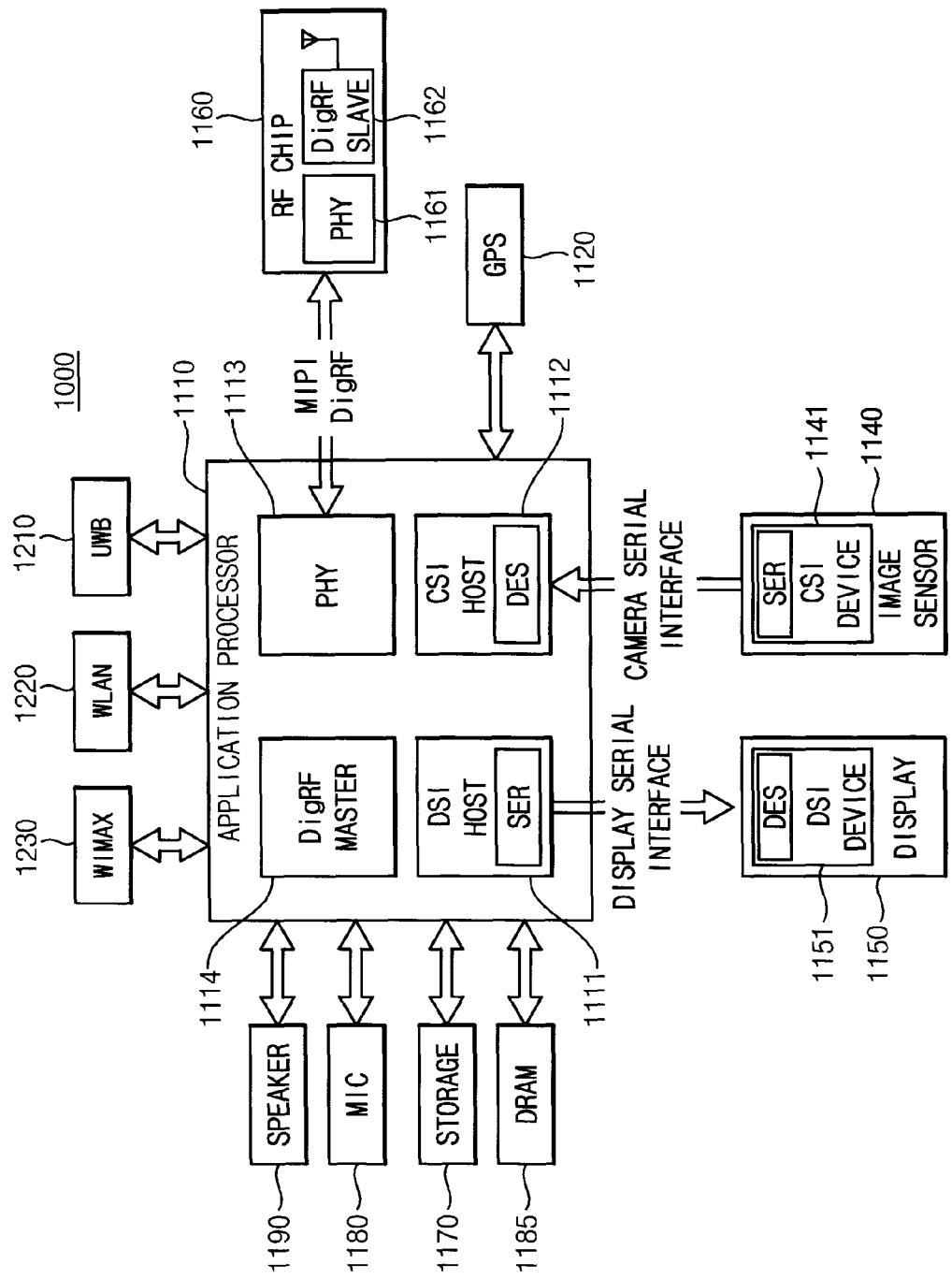
FIG. 15 is a block diagram illustrating an embodiment of an interface used in the computing system of FIG. 14.

FIG. 15 is a block diagram illustrating an example embodiment of an interface that can be used in the computing system of the embodiment of FIG. 14.

Referring to the embodiment of FIG. 15, a computing system 1000 may be implemented by a data processing device (e.g., a cellular phone, a personal digital assistant, a portable multimedia player, a smart phone, a tablet, etc.) that uses or supports a mobile industry processor interface (MIPI) interface. The computing system 1000 may include an application processor 1110, an image sensor 1140, a display device 1150, etc.

A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc., as examples. However, the structure and the interface of the computing system 1000 are not limited thereto.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
   a pixel array configured to generate an analog signal by sensing an incident light; and
   an analog-digital (A/D) conversion unit configured to generate a digital signal in a first operation mode by performing a sigma-delta A/D conversion and a cyclic A/D conversion with respect to the analog signal and to generate the digital signal in a second operation mode by performing a single-slope A/D conversion with respect to the analog signal.

2. The image sensor of claim 1, wherein the first operation mode is a still image photography mode and the second operation mode is a dynamic image video mode.

3. The image sensor of claim 1, wherein, in the first operation mode, the A/D conversion unit is configured to generate most significant bits of the digital signal and residues by performing the sigma-delta A/D conversion with respect to the analog signal and to generate least significant bits of the digital signal by performing the cyclic A/D conversion with respect to the residues.

4. The image sensor of claim 1, further comprising a reference signal generating unit configured to generate a reference signal having a voltage of a substantially constant amplitude and a ramp signal varying at a substantially constant slope.

5. The image sensor of claim 4, wherein the pixel array is configured to generate a first analog signal representing a reset component and a second analog signal representing an image component, and the A/D conversion unit configured to generate a first digital signal corresponding to the first analog signal and a second digital signal corresponding to the second analog signal and to output the digital signal based on a difference between the first and second digital signals.

6. The image sensor of claim 5, wherein the A/D conversion unit comprises:
   a first conversion unit configured to generate the digital signal in the first operation mode by sequentially performing the sigma-delta A/D conversion and the cyclic A/D conversion with respect to the first and second analog signals, respectively, by using the reference signal; and
   a second conversion unit configured to generate the digital signal in the second operation mode by performing the single-slope A/D conversion with respect to the first and second analog signals, respectively, by using a count clock signal and the ramp signal.

7. The image sensor of claim 6, wherein the first conversion unit comprises:
   a correlated double sampling unit configured to generate a reset signal and an image signal by performing a correlated double sampling with respect to the first and second analog signals;
   a switch connected to an output terminal of the correlated double sampling unit for a first time period and connected to a first node for a second time period;
   a subtractor configured to generate a differential signal by subtracting a feedback signal from a signal supplied through the switch;
   an integrator configured to output an integrate signal to the first node by integrating the differential signal;
   a comparator configured to output a compare signal by comparing an amplitude of the integrate signal with an amplitude of the reference signal;
   a digital-analog converter configured to generate the feedback signal by converting the compare signal into an analog signal; and
   a counter configured to generate the digital signal based on the compare signal.

8. The image sensor of claim 7, wherein the counter is configured to generate most significant bits of the first digital signal by summing up the compare signals generated during the first time period when the correlated double sampling unit outputs the reset signal, generate least significant bits of the first digital signal by using the compare signals generated during the second time period, generate most significant bits of the second digital signal by summing up the compare signals generated during the first time period when the correlated double sampling unit outputs the image signal, generate least significant bits of the second digital signal by using the compare signals generated during the second time period, and generate the digital signal by subtracting the first digital signal from the second digital signal.

9. The image sensor of claim 6, wherein the second conversion unit comprises:
   a correlated double sampling unit configured to generate a reset signal and an image signal by performing a correlated double sampling with respect to the first and second analog signals;
   a comparator configured to output a compare signal by comparing an amplitude of the reset signal and the image signal with the ramp signal; and
   a counter configured to generate a first count value by performing a counting operation in synchronization with the count clock signal until the compare signal is transited when the correlated double sampling unit outputs the reset signal, to generate a second count value by performing the counting operation in synchronization with the count clock signal until the compare signal is transited when the correlated double sampling unit outputs the image signal, and to generate the digital signal by subtracting the first count value from the second count value.

10. The image sensor of claim 5, wherein the A/D conversion unit comprises:
    a correlated double sampling unit configured to generate a reset signal and an image signal by performing a correlated double sampling with respect to the first and second analog signals;
    a demultiplexer configured to output the reset signal and the image signal through a first output terminal thereof in the first operation mode and to output the reset signal and the image signal through a second output terminal thereof in the second operation mode;
    a first conversion circuit configured to generate a first compare signal based on a value, which is obtained by integrating a signal received through the first output terminal of the demultiplexer, and the reference signal;
    a second conversion circuit configured to generate a second compare signal based on a signal received through the second output terminal of the demultiplexer and the ramp signal; and
    a counter configured to generate the digital signal in the first operation mode by summing up the first compare signals and to generate the digital signal in the second operation mode by performing a counting operation in synchronization with a count clock signal until the second compare signal is transited.

11. The image sensor of claim 10, wherein the first conversion circuit comprises:
    a switch connected to the first output terminal of the demultiplexer for a first time period and connected to a first node for a second time period;
    a subtractor configured to generate a differential signal by subtracting a feedback signal from a signal supplied through the switch;
    an integrator configured to output an integrate signal to the first node by integrating the differential signal;
    a first comparator configured to output a first compare signal by comparing an amplitude of the integrate signal with an amplitude of the reference signal; and
    a digital-analog converter configured to generate the feedback signal by converting the first compare signal into the analog signal.

12. The image sensor of claim 10, wherein the second conversion circuit comprises a second comparator configured to generate the second compare signal by comparing an amplitude of a signal output through the second output terminal of the demultiplexer with an amplitude of the ramp signal.

13. The image sensor of claim 5, wherein the A/D conversion unit comprises:
    a correlated double sampling unit configured to generate a reset signal and an image signal by performing a correlated double sampling with respect to the first and second analog signals;
    a conversion circuit configured to generate a compare signal in the first operation mode based on a value, which is obtained by integrating the reset signal and the image signal, and the reference signal and to generate the compare signal in the second operation mode based on the reset signal or the image signal and the ramp signal; and a counter configured to generate the digital signal in the first operation mode by summing up the compare signals and to generate the digital signal in the second operation mode by performing a counting operation in synchronization with a count clock signal until the compare signal is transited.

14. The image sensor of claim 13, wherein the conversion circuit comprises:
a switch connected to an output terminal of the correlated double sampling unit for a first time period and connected to a first node for a second time period in the first operation mode;
a subtractor configured to generate a differential signal by subtracting a feedback signal from a signal supplied through the switch;
an integrator configured to output an integrate signal to the first node by integrating the differential signal;
a first multiplexer configured to output the integrate signal in the first operation mode and to output the reset signal and the image signal in the second operation mode;
a second multiplexer configured to output the reference signal in the first operation mode and to output the ramp signal in the second operation mode;
a comparator configured to generate the compare signal by comparing an amplitude of an output signal of the first multiplexer with an amplitude of an output signal of the second multiplexer; and
a digital-analog converter configured to generate the feedback signal by converting the compare signal into the analog signal.

15. A computing system comprising:
an image sensor configured to generate a digital signal corresponding to an incident light;
a storage device configured to store the digital signal; and
a processor configured to control operations of the image sensor and the storage device,
wherein the image sensor comprises:
a pixel array configured to generate an analog signal by sensing the incident light; and
an A/D conversion unit configured to generate the digital signal in a first operation mode by performing a sigma-delta A/D conversion and a cyclic A/D conversion with respect to the analog signal and to generate the digital signal in a second operation mode by performing a single-slope A/D conversion with respect to the analog signal.

16. The system of claim 15, wherein the first operation mode is a still image photography mode and the second operation mode is a dynamic image video mode.

17. A method of sensing an image, comprising:
generating an analog signal by a pixel array in response to sensing an incident light;
generating a digital signal in a first operation mode by performing a sigma-delta A/D conversion and a cyclic A/D conversion with respect to the analog signal by an analog-digital (A/D) conversion unit; and
generating the digital signal in a second operation mode by performing a single-slope A/D conversion with respect to the analog signal by the analog-digital (A/D) conversion unit.

18. The method of claim 17, wherein the first operation mode is a still image photography mode and the second operation mode is a dynamic image video mode.

19. The method of claim 17, further comprising:
generating most significant bits of the digital signal and residues by performing the sigma-delta A/D conversion with respect to the analog signal and to generate least significant bits of the digital signal by performing the cyclic A/D conversion with respect to the residues, in the first operation mode, by the A/D conversion unit.

20. The method of claim 17, further comprising:
generating a reference signal having a voltage of a substantially constant amplitude and a ramp signal varying at a substantially constant slope by a reference signal generating unit.

* * * * *